(12) United States Patent
Ronkainen (10) Patent No.: US 9,030,407 B2
(45) Date of Patent: May 12, 2015

(54) USER GESTURE RECOGNITION

(75) Inventor: Sami Pekka Ronkainen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 381 days.

(21) Appl. No.: 13/333,270

(22) Filed: Dec. 21, 2011

(65) Prior Publication Data
US 2013/0162513 A1 Jun. 27, 2013

(51) Int. Cl.
*G06F 3/0488* (2013.01)

(52) U.S. Cl.
CPC .................. *G06F 3/04883* (2013.01)

(58) Field of Classification Search
CPC .... G06F 3/04883; G06F 3/0488; G06F 3/044
USPC .................. 345/173, 156
See application file for complete search history.

(56) References Cited

U.S. PATENT DOCUMENTS

| | | | |
|---|---|---|---|
| 6,459,424 B1 | 10/2002 | Resman | |
| 2003/0210286 A1* | 11/2003 | Gerpheide et al. | 345/863 |
| 2008/0122798 A1 | 5/2008 | Koshiyama et al. | |
| 2008/0165132 A1* | 7/2008 | Weiss et al. | 345/173 |
| 2008/0174570 A1* | 7/2008 | Jobs et al. | 345/173 |
| 2009/0093994 A1* | 4/2009 | Racaniere | 702/158 |
| 2009/0174679 A1* | 7/2009 | Westerman | 345/173 |
| 2009/0219255 A1* | 9/2009 | Woolley et al. | 345/173 |
| 2009/0231295 A1 | 9/2009 | Petit et al. | |
| 2009/0309851 A1 | 12/2009 | Bernstein | |
| 2009/0315922 A1 | 12/2009 | Lee | |
| 2010/0046766 A1 | 2/2010 | Gregg et al. | |
| 2010/0141684 A1 | 6/2010 | Machida | |
| 2011/0066984 A1* | 3/2011 | Li | 715/863 |
| 2011/0163966 A1 | 7/2011 | Chaudhri | |
| 2011/0312349 A1* | 12/2011 | Forutanpour et al. | 455/466 |
| 2012/0198529 A1* | 8/2012 | Theimer et al. | 726/6 |

FOREIGN PATENT DOCUMENTS

| | | |
|---|---|---|
| EP | 2 101 253 A1 | 9/2009 |
| EP | 2 124 138 A2 | 11/2009 |
| EP | 2 323 023 A2 | 5/2011 |
| WO | WO 2011/036492 A2 | 3/2011 |

OTHER PUBLICATIONS

Partial International Search Report for Application No. PCT/FI2012/051279 dated Feb. 28, 2013.
Kim, J., et al., *The Gesture Watch: A Wireless Contact-Free Gesture Based Wrist Interference*, 11 *th* IEEE International Symposium on Wearable Computers (2007) pp. 15-22.

(Continued)

*Primary Examiner* — Gerald Johnson
(74) *Attorney, Agent, or Firm* — Alston & Bird LLP (57) ABSTRACT

An apparatus comprising: at least one processor; and at least one memory including computer program code, the at least one memory and the computer program code configured to, with the at least one processor, cause the apparatus at least to perform: determining at least one parameter dependent upon a user gesture wherein the parameter is rotation invariant, having the same value when determined at different arbitrary orientations between the apparatus and the user gesture; and using the at least one parameter to determine an action in response to the user gesture.

12 Claims, 5 Drawing Sheets

(56) References Cited

OTHER PUBLICATIONS

International Search Report and Written Opinion for Application No. PCT/IB2012/055759, dated Jul. 9, 2013.
International Search Report and Written Opinion for Application No. PCT/FI2012/051279, dated May 10, 2013.
FingerCloud [online] [retrieved May 10, 2011]. Retrieved from the Internet: <URL: http://dl.acm.org/citation.cfm?id=1753326.753412>. 2 pages.
Cypress touchscreens track hovering fingers, make devices even more 'magical' (video) [online] [retrieved May 10, 2011]. Retrieved from the Internet: <URL: http://www.engadget.com/2010/04/23/cypress-touchscreens-track-hovering-fingers-m...>. 4 pages.
Two Extremes of Touch Interaction—Microsoft Research [online] [retrieved Oct. 19, 2011]. Retrieved from the Internet: <URL: http://research.microsoft.com/en-us/news/features/touch-101711.aspx>. 4 pages.
*Hold on to your patents: Microsoft 'PocketTouch' enables device input through fabric*, GeekWire, Oct. 17, 2011, 12 pages.
*Microsoft Research demo: Augmented reality with Kinect, tablet, distributed computing*, GeekWire, Sep. 27, 2011, 12 pages.
*PocketTouch: through-fabric capacitive touch input*, ACM Digital Library, (2011), 1 page.

\* cited by examiner

USER GESTURE RECOGNITION

TECHNOLOGICAL FIELD

Embodiments of the present invention relate to recognition of user gestures.

BACKGROUND

Proximity detectors such as touch sensitive displays are commonly used in portable electronic apparatus such as tablet computers and smart phones. A user is able to provide input commands by performing a gesture that is detected by the proximity detector such as, for example, moving a point of contact between a touch sensitive display and the user's finger.

BRIEF SUMMARY

According to various, but not necessarily all, embodiments of the invention there is provided any of the apparatuses, methods and computer programs as claimed in the appended claims.

Some but not necessarily all embodiments of the invention have application when a user cannot or cannot easily see the apparatus and therefore cannot orient a co-ordinate system for user gestures.

BRIEF DESCRIPTION

For a better understanding of various examples of embodiments of the present invention reference will now be made by way of example only to the accompanying drawings in which.

DETAILED DESCRIPTION

The Figures illustrate an apparatus 2 comprising: at least one processor 50; and at least one memory 52 including computer program code 54, the at least one memory 52 and the computer program code 54 configured to, with the at least one processor 50, cause the apparatus 2 at least to perform: determining at least one parameter dependent upon a user gesture 14 wherein the parameter is rotation invariant, having the same value when determined at different arbitrary orientations between the apparatus 2 and the user gesture 14; and using the at least one parameter to determine an action in response to the user gesture 14.

The use of user gestures that are rotation invariant in their effect allows a user to provide input to the apparatus 2 without first having to know the orientation (degree of rotation) of the apparatus. This allows a user to provide input to the apparatus 2 without holding and/or without seeing the apparatus.

Figure 1:
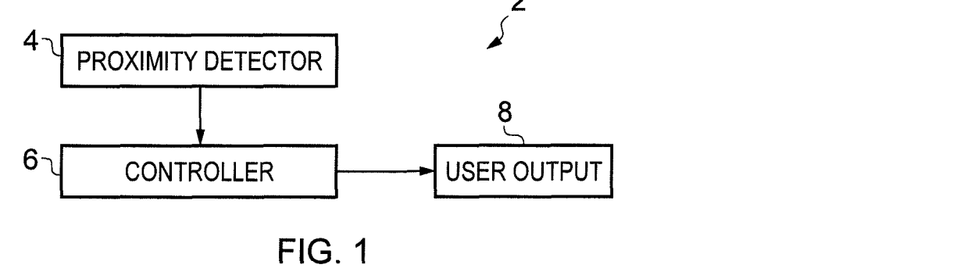
FIG. 1 schematically illustrates an apparatus comprising a proximity detector.

FIG. 1 schematically illustrates an apparatus 2. The apparatus 2 comprises a proximity detector 4, a controller 6 and a user output device 8.

The apparatus 2 may, for example, be an electronic apparatus such as a personal digital assistant, personal media player, mobile cellular telephone, personal computer, a point of sale terminal etc. In some embodiments the apparatus 2 may be a hand-portable apparatus, that is, an apparatus that is sized to be carried in the palm of a hand or in a jacket pocket.

The proximity detector 4 may comprise one or a plurality of proximity sensors which may use any suitable technology.

The proximity detection performed by the proximity detector 4 may, for example, rely on capacitive sensing using one or more capacitive sensors arranged as an array.

The proximity detection performed by the proximity detector 4 may, for example, rely on a resistive touch screen.

The proximity detection performed by the proximity detector 4 may, for example, rely on a camera or cameras such as, for example, infrared cameras.

The proximity detection performed by the proximity detector 4 may, for example, rely on ultrasound sensing using one or more ultrasound sensors.

The proximity detection performed by the proximity detector 4 may, for example, rely on pressure sensing using one or more pressure sensors.

In some but not necessarily all examples, the proximity detector 4 may be a touch screen that detects the location of a touch gesture at or in front of the screen. The touch screen may, for example, be used in combination with a display as a touch screen display.

The proximity detector 4 may operate at a front face of the apparatus 2. Alternatively, or in addition, a proximity detector 4 may operate at a rear face of the apparatus 2. One or both of these proximity detectors may comprise a touch screen.

The proximity detector 4 is configured to disambiguate different user actuations proximal to the proximity detector 4. Gestures are examples of user actuations. That is, the proximity detector 4 is configured to provide outputs that enable differentiation between different user actuations and consequent recognition of a user actuation as a valid user actuation. A valid user actuation is a user actuation that is associated with an action by the apparatus 2. When a user actuation is recognized as a valid user actuation, the associated action is performed as a user input command by the apparatus 2. Each different valid user actuation can be used to reference a different action. As described in more detail below, different valid user actuations are associated with different actions that the apparatus can perform. A specific action may be performed in response to the detection of the associated valid user actuation.

The controller 6 is configured to receive the outputs from the proximity detector 4. It processes the received outputs, recognizing the output received as indicative of a particular detected valid user actuation and performs the appropriate action associated with that user actuation.

In some but not necessarily all embodiments, the apparatus 2 can operate in more than one state, for example, in at least a first state or a second state.

Figure 2:
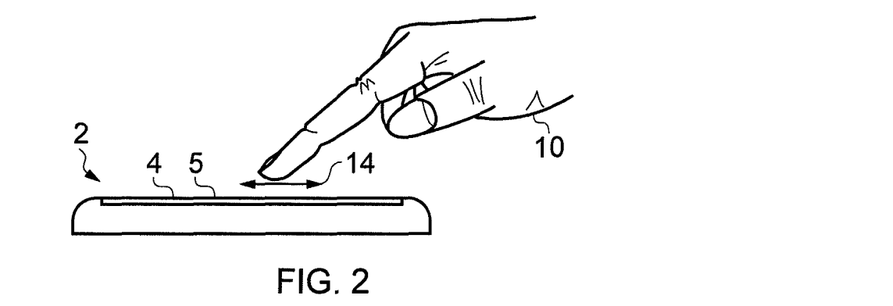
FIG. 2 illustrates using the apparatus in a first state (or second state) to disambiguate a first set (or second set) of valid user actuations.

FIG. 2 illustrates a situation in which the apparatus 2 is in a first state or the second state and is disambiguating a first set of user actuations 14 or a second set of user actuations 14. The user actuations 14 are, in this example, hand gestures made by movement of a hand 10 and the proximity detector 4 is, in this example, a touch sensitive display. In some but not necessarily all examples the proximity detector 4 enables touch input over a display 5.

The apparatus 2 may be configured to switch, in response to detecting a first criteria, from the first state to the second state.

The apparatus 2 may be configured to switch, in response to detecting a second criteria, from the second state to the first state.

In the first state the outputs of the proximity detector 4 are used to disambiguate user actuations in a first set of user actuations and perform the respective actions associated with the disambiguated user actuations.

In the second state the outputs of the proximity detector 4 are used to disambiguate user actuations in a second set of user actuations and perform the respective actions associated with the disambiguated user actuations.

The second set of user actuations may be the same or different to the first set of user actuations and may comprise user gestures that are invariant in effect whatever the (fixed) orientation of the apparatus 2 relative to the user gesture when the user gesture is performed.

In some but not necessarily all embodiments, the first set of user actuations and the second set of user actuations are mutually exclusive sets.

In some but not necessarily all examples, the second set of user actuations may be smaller than the first set of user actuations.

The first criteria, in some examples, may be satisfied by user input and in other examples or circumstances automatically. The first criteria may, in some but not necessarily all examples, be satisfied when the apparatus detects that the user cannot see the apparatus, for example, because it is in a pocket or the there is very low ambient lighting and the apparatus is in a low light emission mode.

The detection of the first criteria and/or the second criteria may involve one or more criteria detectors. A criteria detector is a detector that detects a criteria. The proximity detector 4 may, optionally, be used as a criteria detector. Alternatively or additionally, other detection may be performed e.g. by accelerometers or microphones or other proximity detection may be performed e.g. optical or ultrasound sensing using one or more sensors. A transmitter may be used as a source of waves (e.g. infrared light or ultrasound) and a receiver may be used to detect waves reflected by a proximal object. If more than one proximity detector 4 is used they may sense the same parameter (e.g. capacitance, reflected light or reflected ultrasound) or different parameters.

Figure 3:
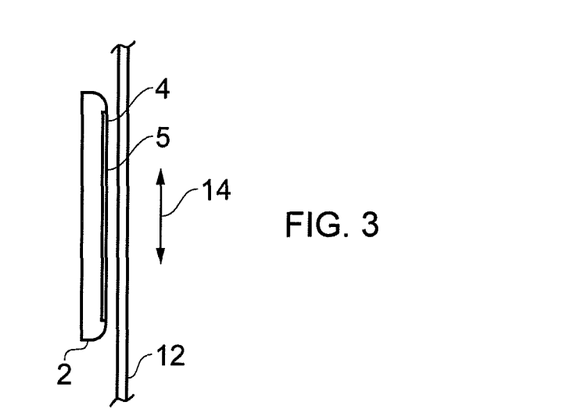
FIG. 3 illustrates using the apparatus is the second state to disambiguate a second set of valid user actuations.

FIG. 3 illustrates a situation in which the apparatus 2 is in a second state and is disambiguating a second set of user actuations 14. The user actuations are, in this example, hand gestures and the proximity detector 4 is, in this example, a touch sensitive display. The proximity detector 4 enables touch input over a display 5.

The display 5 may be in a low power consumption mode when the apparatus 2 is in the second state. As an example, the display 5 may be disabled.

In FIG. 3, a barrier 12 is positioned between the user making the user actuations 14 and the proximity detector 4. The barrier 12 may prevent a user from seeing or clearly seeing the apparatus 2, The barrier may, for example, be opaque. In the illustrated example, the barrier 12 is a piece of clothing. The clothing may be any suitable clothing material such as fabric, cloth, clothes, apparel etc.

The apparatus 2 in the second state is configured to disambiguate accurately the second set of user actuations 14 despite the user actuations 14 being separated from the at least one proximity detector 4 by the barrier 12.

In some but not necessarily all examples the disambiguation in the presence of a barrier 12 may require an increase in the detection sensitivity of the proximity detector 4. This increase in sensitivity may be controlled at the proximity detector 4 itself or controlled during processing outputs from the proximity detector 4

A detection event occurs when a proximity detector 4 detects an actuation. A detection event may be triggered (caused) by user actuations at a greater threshold distance from the proximity detector 4 in the second state than the first state. Therefore, in the second state, a detection event may be triggered even if a barrier 12 intercedes between the user actuation and the proximity detector 4. This increased sensitivity will decrease spatial resolution.

For example, the proximity detector 4 may have a higher gain in the second state than the first state making it more sensitive. The higher gain may, for example, be obtained by amplifying output signals from the proximity detector 4 or be obtained by combining or integrating output signals from adjacent proximity detectors 4 or adjacent groups of sensors within a proximity detector 4.

For example, in some but not necessarily all embodiments, after detection of the first criteria the apparatus 2 may switch automatically from using the at least one proximity detector 4 in a high definition mode to disambiguate the first set of user actuations to using the at least one proximity detector 4 in a low definition mode to disambiguate a second set of user actuations instead of the first set of user actuations.

The terms 'definition' and 'spatial resolution' are synonymous. The term high definition when used in the context of detection or actuation means that there is a high information content per unit area, that is, there is a high spatial resolution. The term low definition when used in the context of detection or actuation means that there is a low information content per unit area, that is, there is a low spatial resolution. The relationship between low spatial resolution and high spatial resolution is such that the information content per area for high spatial resolution may, for example, be more than 2, 4, 16, or even 64 times greater than the information content per area for low spatial resolution.

Figure 4A:
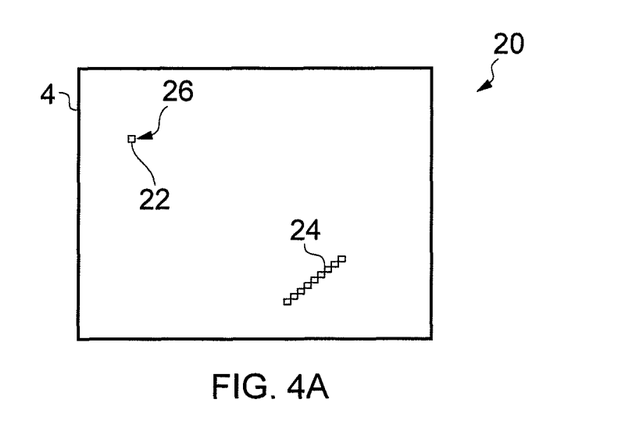
FIG. 4A illustrates how individual sensor elements of a proximity detector may be used in a high definition mode to sense high definition user actuations.
Figure 4B:
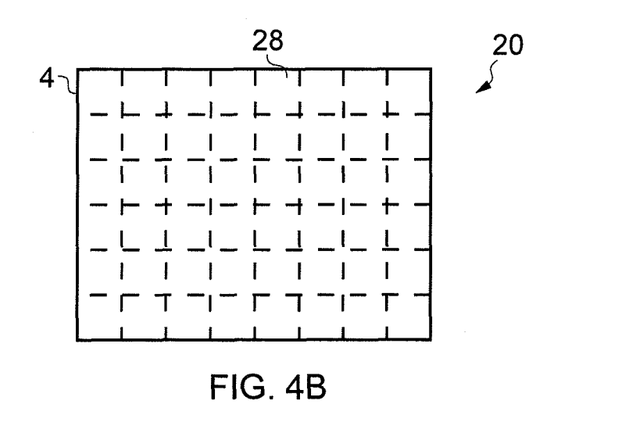
FIG. 4B illustrates how groups of individual sensor elements of a proximity detector may be used in a low definition mode to sense low definition user actuations.

FIGS. 4A and 4B illustrate an example of a proximity detector arrangement that comprises an N row×M column array of proximity sensor-elements 26. Each sensor element is small, for example, less than 0.5 cm by 0.5 cm. The centers of adjacent sensor elements in a row or column of the array are separated by, for example, less than 1 cm.

In a high definition mode illustrated in FIG. 4A each sensor element operates as a proximity detector 4. The proximity detectors 4 are able to disambiguate an instantaneous user actuation at a first location (e.g. a touch) from an instantaneous user actuation at a second location (e.g. a touch) separated from the first location by, for example, less than 0.5 cm.

In the high definition mode, a user may therefore be able to actuate individual sensor elements distinctly using separate user actuations. The user actuation can therefore be confined to a small area at an instant in time, for example as an instantaneous input point 22. The user actuation 14 can be a gesture such as, for example, a swipe extending over a series of small contiguous areas over time, for example as a trace input point 24.

In a low definition mode, illustrated in FIG. 4B, the N×M sensor elements are used as n×m groups 28 of sensor elements. Each group 28 of sensor elements is an array of N/n× M/m array of sensor elements. n and m are >1.

Each group 28 of sensor elements operates as a single proximity detector 4. This may, for example, be achieved by using output from only one sensor element in a group 28 or by combining all outputs of the sensor elements in a group 28.

The size (area) in which detections are made by a group 28 is significantly greater than the size (area) in which detections are made by a sensor element. In the low definition mode there are therefore fewer proximity sensors 26 per unit area. The groups 28 may not therefore be able to disambiguate a high definition user actuation such as an instantaneous user actuation at a first location from an instantaneous user actuation at a second location separated from the first location by less than, for example, 0.5 cm.

However, low definition user actuations can be disambiguated. A low definition user actuation 14 is a user actuation 14 that extends over a series of groups 28 over time, for example as a swipe input.

Referring back to FIG. 1, in the first state and the second state may or may not map to particular definition modes. The apparatus 2, in the first state, may operate in the high definition mode and/or the low definition mode. The apparatus 2, in the second state, may operate in the high definition mode and/or the low definition mode.

In some but not necessarily all embodiment, the apparatus, in a first state, may operate in the high definition mode and the apparatus 2 in the second state may operate in the low definition mode.

The particular definition mode that is operational may affect the outputs from the proximity detector 4 and/or affect the processing of the outputs by the controller 6. The first set of user actuations may therefore include high definition user actuations and low definition user actuations whereas the second set of user actuations is restricted to only low definition user actuations.

Figure 10A:
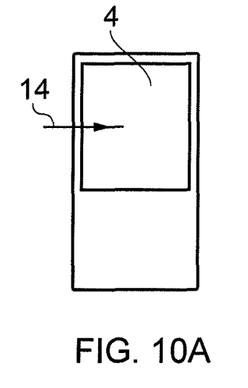
FIGS. 10A to 10C illustrate an example apparatus at different orientations.
Figure 10B:
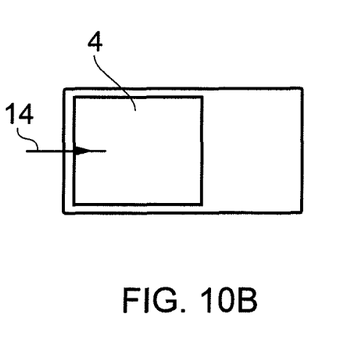

Referring to FIGS. 10A, 10B the same user gesture 14 is invariant in effect despite different orientations of the apparatus 2 when the user actuation is performed. If the apparatus has been rotated relative to the user actuations through any 90, 180 or 270 degrees, then the user gesture is invariant in effect.

Figure 10C:
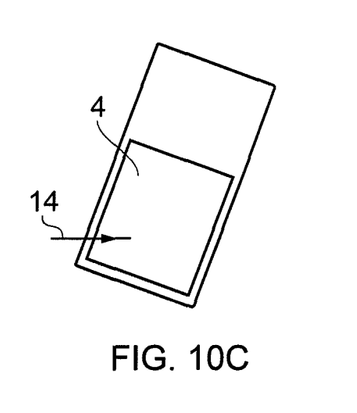

Referring to FIGS. 10A, 10B and 10C the same user gesture 14 may be invariant in effect despite different arbitrary orientations of the apparatus 2 when the user actuation is performed The apparatus 2 may be configured to discriminate between valid user gestures 14, whatever orientation the apparatus 2 has been placed into, relative to the user gesture 14, for the duration of the user gesture 14, by determining one or more rotation invariant parameters for the user gesture 14.

The rotation invariant parameter has the same value when determined at different arbitrary orientations between the apparatus and the user gesture 14.

The rotation invariant parameter is then used to determine an action performed by the apparatus 2 in response to the user gesture.

The user is therefore able to provide user commands to the apparatus 2 using gestures without knowing or caring about the particular orientation of the apparatus 2 at that time.

Figure 15:
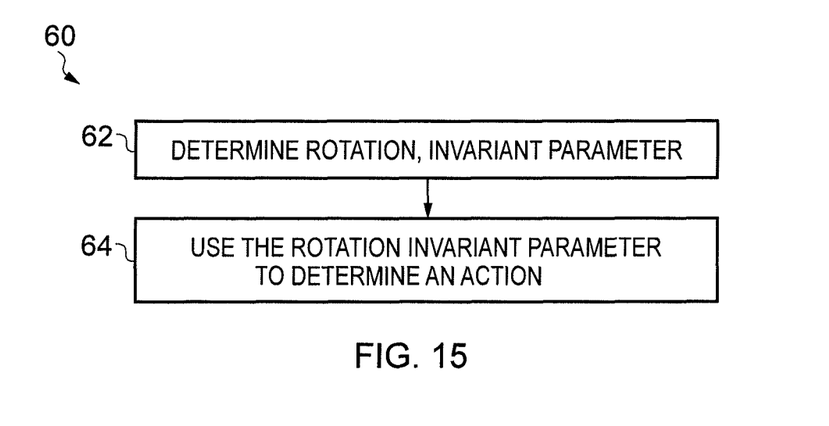
FIG. 15 illustrates an example of a method for determining a rotation invariant parameter for a user gesture.

FIG. 15 schematically illustrates a method 50 that enables a user to provide user commands to the apparatus 2 using gestures without knowing or caring about the particular orientation of the apparatus 2.

At block 62, the rotation invariant parameter is determined. Then at block 64 the rotation invariant parameter is used to determine the action.

A differentiating feature of a user gesture 14 may be its direction rather than an absolute location of a particular start or end point. Such a user gesture that does not depends on a particular location for a start point or end point may be described as an 'un-tethered' or 'relative' input. The relative relationship between the start point and end point defines the user gesture rather than their absolute locations.

A tethered input is defined as an actuation that requires a particular start and/or end point. It is an absolute input. An un-tethered input is defined as an actuation that does not require a particular start and/or end point. It is a relative input.

If un-tethered user gestures are enabled, the user is therefore able to provide user commands to the apparatus 2 using gestures without knowing or caring about the particular relative position of the apparatus 2 to the user at that time.

It may therefore be desirable to use a parameter that has translation invariance. Translational invariance means that the parameter has the same value whatever lateral translation is in place between the apparatus 2 and the user gesture 14, for the duration of the user gesture 14.

As an example, where the user gesture is performed on a plane, for example on a touch screen, the orientation invariant parameter has the same value when determined at different arbitrary orientations between the plane and the user gesture. If the orientation invariant parameter additionally has translation invariance, it will have the same value when determined at different arbitrary positions of the user gesture on the plane. In the example where a touch screen is used as a proximity detector 4 the plane is often a two-dimensional plane, although curved planes may also be used for touch screens.

The parameter may additionally be chosen such that it discriminates between user gestures 14 with different handedness. That is the parameter has different values for a first user gesture and a second user gesture where the second user gesture is the same as the first user gesture except that the first user gesture and the second user gesture have opposite handedness. That is the first gesture and the second gesture are chiral (are mirror images) and cannot be superimposed no matter what relative rotation/orientation is used. This enables gestures with different handedness to be differentiated.

FIGS. 5A, 5B, 6A, 6B, 7A, 7B, 7C, 8A, 8B, 9A and 9B illustrate different examples of user gestures 14 that are invariant in effect despite different orientations of the apparatus 2 when the user actuation is performed. In these examples the user gestures 14 are traces performed on a touch sensitive display 5. However, different examples are possible.

A user gesture 14 may be parameterized relative to a reference dynamically defined by the user gesture 14. The reference may, for example, be a crossing point where an edge 25 of a touch sensitive device 4 is crossed (FIGS. 5A, 5B) or crossing points where an edge or edges 25 of a touch sensitive device 4 are crossed (FIGS. 6A, 6B, 7A, 7B, 7C). The edge may be configured so that is perceptible to a user's touch. The edge may form a rectangle having a pair of parallel edges that are orthogonal to a different pair of orthogonal edges.

The parameterization may be used to create the rotation invariant parameter for the user gesture 14. In these examples, the rotation invariant parameter is dependent upon detection of the user gesture 14 at one or more edges 25.

The apparatus 2 may be configured to detect an entry edge detection event when a gesture enters a detection area defined by the edge 25 of the touch sensitive device 4. This may, for example, be detected by measuring a distance between a user gesture 14 and the edges 25 of the detection area when the user gesture 14 is first detected. If the distance is zero for any edge then an entry edge detection event is detected for that edge.

The apparatus 2 may be configured to detect an exit edge detection event when the gesture exits the detection area. This may, for example, be detected by measuring a distance between a user gesture 14 and the edges 25 of the detection area when a user gesture 14 approaches an edge 25. If the distance to that edge 25 is zero when the user gesture 14 is last detected then an exit edge detection event is detected for that edge.

The apparatus 2 is configured to determine the orientation invariant parameter in dependence upon relative positions and/or timings of the entry edge detection event and the exit edge detection event.

The table below illustrates that each of the user gestures 14 illustrated in FIGS. 5A, 5B, 6A, 6B, 7A, 7B and 7C can be differentiated by detecting whether there is an entry edge detection event ('Entry'), whether there is an exit edge detection even ('Exit'), and where there is an entry edge detection event and an exit edge detection event, then by using the order in time and relative positions of the detection events. These variables may be used as a basis for the orientation invariant parameter.

| Fig | Description of gesture | Initial Edge Detection Event | Next Edge Detection event | Position of exit edge relative to entry edge |
|---|---|---|---|---|
| 5A | Inwards | Entry | None | None |
| 5B | Outwards | Exit | None | None |
| 6A | In, then out | Entry | Exit | Same edge |
| 6B | Out, then in | Exit | Entry | Same edge |
| 7A | Turn left | Entry | Exit | Left |
| 7B | Turn right | Entry | Exit | Right |
| 7C | Straight through | Entry | Exit | Opposite |

Figure 5A:
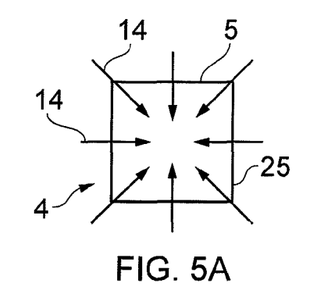
FIG. 5A illustrates an example of an inward swipe user actuation.

For FIG. 5A, the rotation invariant parameter is dependent upon a determination of an entry edge detection event as an initial edge detection event and a lack of determination of an exit edge detection event within a following threshold timeout period.

Figure 5B:
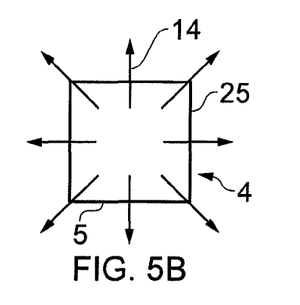
FIG. 5B illustrates an example of an outward swipe user actuation.
Figure 6A:
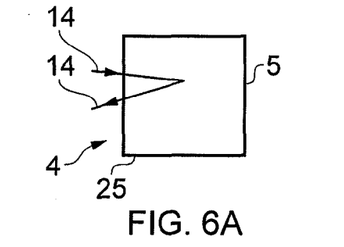
FIG. 6A illustrates an example of a user gesture that involves an inward swipe followed by an outward swipe in an opposite direction.
Figure 6B:
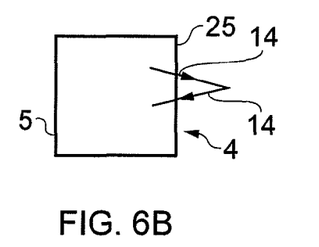
FIG. 6B illustrates an example of a user gesture that involves an outward swipe followed by an inward swipe in an opposite direction.
Figure 7A:
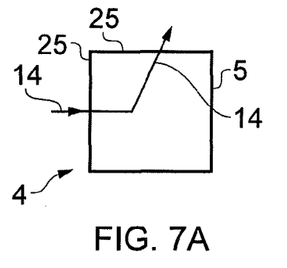
FIGS. 7A and 7B illustrate examples of user gestures that involve an inward swipe followed by an outward swipe in a different direction.
Figure 7B:
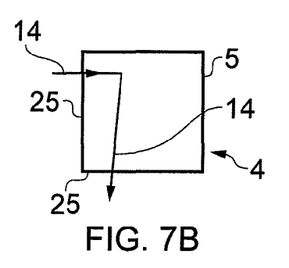
Figure 7C:
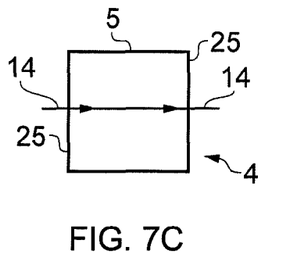
FIG. 7C illustrates an example of a user gesture that involves an inward swipe followed by an outward swipe in the same direction.

For FIG. 5B, the rotation invariant parameter is dependent upon a determination of an exit edge detection event as an initial edge detection event and a lack of a determination of an entry edge detection event within a following threshold timeout period For FIGS. 6A, 6B, 7A, 7B and 7C the rotation invariant parameter is dependent upon relative positions and timings of the entry edge detection event and the exit edge detection event.

FIGS. 8A, 8B, 9A and 9B illustrate examples of user gestures 14 that are invariant in effect despite different orientations of the apparatus 2 when the user actuation is performed. In these examples the user gestures 14 are traces performed on a touch sensitive display 5. However, different examples are possible.

A user gesture 14 may be parameterized relative to a reference dynamically defined by the user gesture 14. The reference may, for example, be an initial position or velocity of the user gesture 14.

Figure 8A:
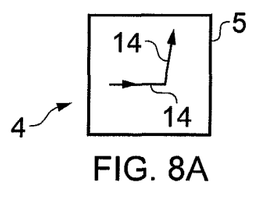
FIGS. 8A and 8B illustrate examples of user gestures that involve an inward swipe followed by an outward swipe in a different direction.
Figure 8B:
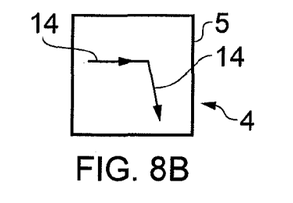
Figure 9A:
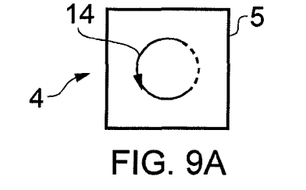
FIGS. 9A and 9B illustrate examples of user gestures that involve a directional swipe in a counter-clockwise direction and clockwise direction.
Figure 9B:
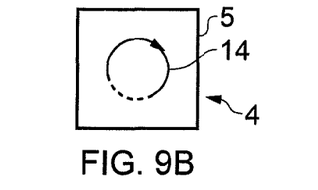

Each illustrated user gesture 14 comprise a turn. In FIGS. 8A and 9A, the turn is in a counter-clockwise direction. In FIGS. 8B and 9B, the turn is in a clockwise direction. The direction of a turn may be determined as clockwise or counter-clockwise by reference to a change in direction of a user gesture.

The parameterization may be used to create the rotation invariant parameter for the user gesture 14.

The user gesture may be modeled as motion in space of a point along a path. In these examples, the rotation invariant parameter is dependent upon movement of that point during the user gesture 14.

For example, the user actuation can be parameterized with reference to a notional axis about which the user actuation turns (but does not touch).

The rotation invariant parameter may have positional invariance. Positional invariance means that the user gesture 14 has the same value when the user gesture is started at different arbitrary positions relative to the apparatus.

A rotation invariant parameter may, for example, be dependent upon one or more of a change of speed of the point in a first direction $\Delta v_x$, a change in displacement of the point in the first direction $\Delta x$, a change in velocity of the point in a second direction $\Delta v_y$ and a change in displacement of the point in the second direction $\Delta y$.

The first direction may, for example, be defined by movement of the point preceding a change in direction or by an initial movement of the point during the user gesture 14. The second direction is orthogonal to the first direction.

Parameters that are rotation invariant but do not respect handedness of gestures include:

mod [$\Delta x$]+mod [$\Delta y$]

or mod [$\Delta v_x$]+mod [$\Delta v_x$]

A parameter that is rotation invariant and does respect handedness of gestures is the curl of a velocity of the gesture 14. The curl is a vector operator that describes the infinitesimal rotation of a vector field. It is the vector field having magnitude equal to the maximum 'circulation' at each point and is oriented perpendicularly to the plane of circulation for each point. The maximum circulation is the line integral of the vector field around a closed loop bounding an infinitesimal area, in the limit of the area tending to zero.

The rotation invariant parameter may therefore be expressed in two dimensions as:

$$(\Delta v_x/\Delta x) - (\Delta v_x/\Delta v_y)$$

or $$(\Delta y/\Delta x) - (\Delta x/\Delta v_y)$$

It should be appreciated that the rotation invariant parameter for different user gestures has different time varying values. The variation over time of the rotation invariant parameter may be used to disambiguate a user gesture amongst a plurality of valid user gestures.

For example, a direction of a curl vector (its sense) can be used to discriminate between chiral user gestures such as those that use counter-clockwise motion (FIGS. 8A, 9A) and those that use clockwise motion (FIGS. 8B, 9B).

For example, an initial magnitude of the curl vector may be used to discriminate between a user gesture 14 that starts with significant curvature (FIG. 9A) and one that includes significant curvature but does not start with significant curvature (FIG. 8A).

For example changes in the curl vector during the user gesture may be used to discriminate between a circular gesture (constant curl) and an oval gesture (periodically varying curl) or between a circle gesture and an inward spiral (curl monotonically increases in magnitude) or an outward spiral (curl monotonically decreases in magnitude).

It will be appreciated that these are merely some examples and it is possible to discriminate between many different gestures using a curl vector as a rotation invariant parameter.

In FIG. 8A the user actuation 14 is a veer-to-left user actuation, where the user actuation changes suddenly from having a forward trajectory to having a trajectory with a significant component to the left.

In FIG. 8B the user actuation 14 is a veer-to-right user actuation, where the user actuation changes suddenly from having a forward trajectory to having a trajectory with a significant component to the right.

In FIGS. 9A and 9B, the user actuation 14 is a part or a whole of a circulation gesture. A circulation gesture is one that, if continued, would travel through an arc of at least 360 degrees with or without displacement. It may for example form a circle, a spiral etc.

FIG. 9A illustrates an example of a counter-clockwise swipe user actuation 14. It is a large scale gesture that moves in an counter-clockwise direction around a notional axis that may or may not be positioned at a central area of the touch sensitive display 4.

FIG. 9B illustrates an example of a clockwise swipe user actuation 14. It is a large scale gesture that moves in a clockwise direction around a notional axis that may or may not be positioned at a central area of the touch sensitive display 4.

Figure 13:
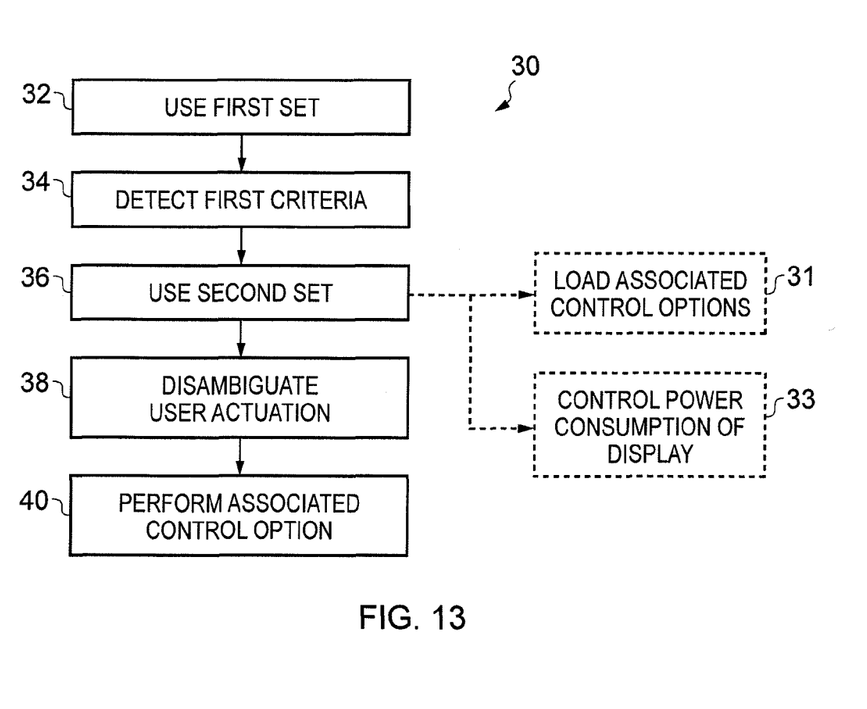
FIG. 13 illustrates an example of a method for switching to a second state to disambiguate the second set of valid user actuations.

FIG. 13 illustrates a method 30 for switching to a second state to disambiguate the second set of valid user actuations.

At block 32, the apparatus 2 is being used in the first state. In the first state the apparatus 2 is used to disambiguate a first set of user actuations and perform associated control commands.

At block 34, if a first criteria is detected then the method continues to block 36. Although the term criteria is normally used to indicate more than one criterion, in this document the term 'criteria' should be understood to indicate one or more criterion. Examples of criteria are discussed in more detail below.

At block 36, the apparatus 2 switches from the first state to the second state. In the second state, the apparatus 2 disambiguates a second set of user actuations comprising user gestures instead of the first set of user actuations.

The second set of valid user actuations comprises user gestures that are invariant in effect if the apparatus is rotated relative to the user actuations.

At block 38, the apparatus 2 detects user gesture 14, identifies the user gesture 14 as a valid user actuation of the second set and disambiguates the valid user actuation identifying it as a particular one of the second set of valid user actuations. This step may occur at the proximity detector 4 itself or it may occur at the controller 6 or it may occur via cooperation of the proximity detector 4 and the controller 6.

At block 40, the apparatus 2 performs a control command that is associated with the identified valid user actuation of the second set of valid user actuations.

In some but not necessarily all embodiments, the first set of user actuations may, for example, be used to start an application so that it is in-use, to stop an in-use application and/or to swap which application is in use. The first set of user actuations may, for example, be used to provide controls for the multiple different applications.

An input control command may be associated with each member of the first set of user actuations. The large number of user actuations in the first set enable a large number of different control commands including commands that enable a user to control selection of applications for use.

The second set of valid user actuations may be fixed (standardized) or it may be changed. For example, the second set of valid user actuations may be context dependent being dependent upon a context existing when the first criteria is detected. There may be a different second set of valid user actuations for each one of a plurality of different contexts. An example of a context is the identity of an application that is in-use when the first criteria is detected. This provides for context-dependent input. For example, a set defining valid user actuations may change with context.

The control commands associated with the second set of valid user actuations may be fixed or may be changed. The associated set of control commands may be dependent upon a context existing when the first criteria is detected.

There may be a different set of control commands for each one of a plurality of different contexts. An example of a context is the identity of an application that is in-use when the first criteria is detected. This provides for context-dependent output. For example, the same valid user actuation may have a different consequence depending upon context. As another example, depending upon context, different valid user actuations may have the same consequence.

In some but not necessarily all examples, in response to changing states at block 36, the method 30 may perform block 31. At block 31 a set of control commands are associated with a second set of valid user actuations.

At block 31, a library of input control commands is accessed using an identifier of the context. The identifier may, for example, identify an application that was in use when the first criteria were satisfied at block 34. The control commands for the context are retrieved and used to convert a valid user actuation to a control command.

In some embodiments, the second set of valid user actuations is dependent upon an application that is in-use when the first criteria is detected. The retrieved control commands provide, for the current in-use application, a mapping (an association) between each particular user actuation of the second set of user actuations and a particular command for the in-use application. The commands enable user control of the in-use application but in some embodiments may not enable selection of a new application for use.

The first criteria may, for example, be dependent upon one or more of: a proximity detection trigger; an apparatus orientation trigger; and a user-locking trigger.

A proximity detection trigger is a trigger event that is activated when a particular proximity detection event occurs or a combination of proximity detection events occur. The proximity detection trigger may, for example, require a minimum duration of a user actuation and/or a minimum intensity (e.g. touch area) of a user actuation. As an alternative or as an addition, the proximity detection trigger may, for example, require that proximity detection occurs at a front face 21 of the apparatus and a back face 23 of the apparatus 2 simultaneously.

An apparatus orientation trigger is a trigger event that is activated when a particular orientation of the apparatus 2 occurs. The orientation trigger may, for example, require a particular orientation of the apparatus for a minimum duration.

A user-locking trigger is a trigger event that is activated when a user applies a full or partial lock to the apparatus 2. The full lock may, for example, prevent user input to the apparatus 2. The partial lock may, for example, restrict user input to the apparatus 2.

Alternatively, the first criteria may be satisfied when a particular sequential pattern of user actuations occur.

Alternatively, the first criteria may be satisfied when a particular sequential pattern of events occur that may, for example, be indicative of the apparatus 2 being stowed in a pocket.

One example of a sequential pattern of events indicative of the apparatus 2 being stowed in a pocket is: an application is in-use, then the user applies a user lock to the apparatus while the application is in use, and then a stowage event occurs within a timeout period.

An example of a stowage event is that it is detected that the apparatus 2 has been continually adjacent another object following a timeout period following locking of the apparatus or adjacent objects at its front and back since a timeout period following locking of the apparatus.

Another example of a stowage event is that it is detected that the apparatus 2 has been continually in a substantially vertical orientation since a timeout period following locking of the apparatus 2.

Another example of a stowage event is that it is detected that the apparatus 2 has been continually in a vertical orientation and adjacent an object (or objects) since a timeout period following locking of the apparatus 2.

In some but not necessarily all embodiments, in response to changing states at block 36, the method 30 may perform block 33. At block 33, power consumption of a display 5 is controlled.

The display 5 may be placed in a low power consumption mode. As an example, the display 5 may be disabled.

At block 34, if a further criteria is detected rather than a first criteria the apparatus 2 may be configured to prevent use of the proximity detector 4 until the further criteria is no longer satisfied. The further criteria may, for example, be that the apparatus 2 is held adjacent a user's head to make or receive a telephone call or some other scenario that requires locking of the proximity detector to prevent inadvertent user input.

The second set of valid user actuations comprises user gestures that are invariant in effect despite different orientations of the apparatus 2 when the user actuation is performed. That is, for any arbitrary orientation of the apparatus, the user gesture has the same effect. Therefore performing the same user gesture produces the same effect irrespective of how the apparatus has been rotated.

In some examples, the second set of valid user actuations consists of only user gestures that are invariant in effect despite different orientations of the apparatus 2 when the user actuation is performed. In this example, user input using gestures in the second state is only via user gestures that are invariant in effect despite different orientations of the apparatus 2 when the user gesture is performed.

In contrast, the first set of valid user actuations may, in some examples, not comprise any user gestures that are invariant in effect despite different orientations of the apparatus 2 when the user actuation is performed. In this example, the determination of a rotation invariant parameter for a user gesture is not required in the first state.

The apparatus 2 may associate each of a plurality of user gestures that are rotation invariant in effect with an action. The apparatus 2 determines the rotation invariant parameter for a user gesture. If the apparatus 2 recognizes that the rotation invariant parameter defines a particular one of the plurality of user gestures, it performs the action associated the that particular user gesture. The action may control output to a user such as, for example, audio output to the user and/or haptic feedback to the user.

Examples of how the apparatus 2 may be used will now be described.

The apparatus 2 may be used for one or more different uses and user gestures that are rotation invariant in effect may be used to control these uses.

For example, the apparatus 2 may be used for providing output to a user. The output may be, for example, audio output and/or haptic output. The user gestures that are rotation invariant in effect may be used to prevent, restrict or otherwise control the output.

As an example, a user gesture that is rotation invariant in effect may be used to reject an incoming cellular telephone call.

As an example, a user gesture that is rotation invariant in effect may be used to accept an incoming cellular telephone call.

As an example, a user gesture that is rotation invariant in effect may be used to silence an alert whether an audio alert or a haptic alert such as, for example, a vibration.

As an example, a user gesture that is rotation invariant in effect may be used to silence an audio output such as spoken navigation directions, a hands free telephone conversation etc.

In the following example, the second set of user actuations control audio output from an application such as a music player application for playing music tracks.

The second set of user actuations may comprise a first directional swipe gesture 14 for scrolling forward one music track to a next music track and playing that next music tack. Examples of suitable first directional swipe gestures are illustrated in FIGS. 5A, 6A, 7A, 8A and 9A.

The second set of user actuations may comprise a second directional swipe gesture 14, different to the first directional swipe gesture, for scrolling backward one music track to a prior music track and playing that prior music tack. Examples of suitable second directional swipe gestures are illustrated in FIGS. 5B, 6B, 7B, 8B and 9B.

The second set of user actuations may comprise a cover-uncover actuation for controlling volume. A cover-uncover actuation is an actuation having a first cover portion when a user's hand is brought close to the apparatus 2 and a second uncover portion when a user's hand is pulled back from the apparatus 2. The change in volume may be determined by a period of time for which a cover portion of the cover-uncover actuation occurs. The control may toggle between increasing volume and decreasing volume with each cover-uncover actuation. Thus when it is used first it decreases volume, when it is used next it increases volume, when it is used next it decreases volume. For safety and user comfort it may always initially decrease volume.

Figure 11:
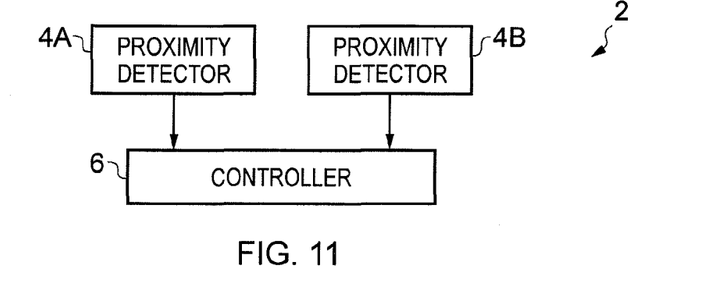
FIG. 11 illustrates an example apparatus similar to that illustrated in FIG. 1 comprising two distinct proximity detectors.

FIG. 11 illustrates an apparatus 2 similar to that illustrated in FIG. 1. In this example, the apparatus 2 has two distinct proximity detectors 4A, 4B, but other examples may have more proximity detectors Either one of the proximity detectors 4A, 4B may operate as the proximity detector 4 described above. The other proximity detector may be used, for example, in determining whether or not the first and/or second criteria are satisfied.

Figure 12:
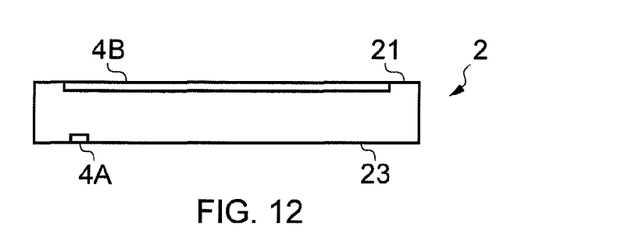
FIG. 12 illustrates an example of the apparatus illustrated in FIG. 11 in cross-section.

FIG. 12 illustrates an example of the apparatus 2 illustrated in FIG. 11 in cross-section. The apparatus 2 has a front face 21 and an opposing back face 23. One or more first proximity detectors 4B are positioned on the front face 21 of the apparatus. One of the first proximity detectors 4B may be similar to the user-input proximity detector 4 previously described. It may for example be a touch sensitive display. A second proximity detector 4A is positioned on the back face 23 of the apparatus 2.

The detection of the first criteria and/or the second criteria may involve one or more of the first proximity detectors and/or the second proximity detectors. If so, the proximity detectors 4A, 4B are being used as criteria detectors.

Criteria detectors may use any suitable type of detector such as capacitance sensing or optical or ultrasound sensing or acceleration sensing. For ultrasound or optical sensing, a transmitter (or an ambient external source) may be used as a source of waves (e.g. visible light, infrared light or ultrasound) and a receiver may be used to detect waves reflected by a proximal object. If more than one criteria detector is used they may sense the same attribute (e.g. capacitance, reflected light or reflected ultrasound) or different attributes.

If the apparatus 2 illustrated in FIG. 12 was placed in a pocket one would expect a proximity detection event to be recorded by the first proximity detector 4B and the second proximity detector 4A simultaneously. A proximity detection event may occur, for example, when a proximity detector detects an object with a proximity less than a threshold value. This may be a necessary or a sufficient condition for satisfying the first criteria.

Other conditions for satisfying the first criteria may be provided using additional or alternative sensors as criteria detectors. For example orientation may be measured using one or more of: accelerometers, a magnetometer, and a gyroscope.

Referring back to FIGS. 1 and 11, Implementation of the controller 6 can be in hardware alone (e.g. a circuit a processor, a field programmable gate array, or an application-specific integrated circuit), in software alone, or in a combination of hardware and software, The term "software" encompasses "firmware".

The controller may be implemented using instructions that enable hardware functionality, for example, by using executable computer program instructions in a general-purpose or special-purpose processor that may be stored on a computer readable storage medium (disk, memory etc) to be executed by such a processor.

Figure 14:
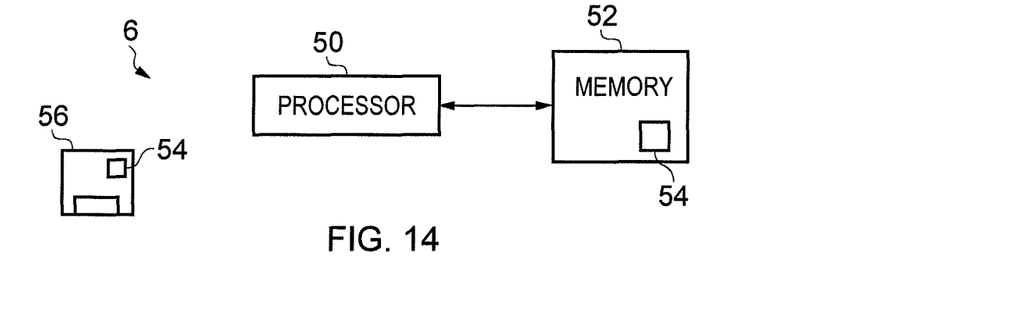
FIG. 14 illustrates an example of a controller comprising a processor.

FIG. 14 illustrates an example of a controller 6 comprising a processor 50. The processor 50 is configured to read from and write to memory 52. The processor 50 may also comprise an output interface via which data and/or commands are output by the processor 50 and an input interface via which data and/or commands are input to the processor 50.

The memory 52 stores a computer program 54 comprising computer program instructions that control the operation of the apparatus 2 when loaded into the processor 50. The computer program instructions 54 provide the logic and routines that enable the apparatus to perform the methods described and illustrated, for example, in FIGS. 13 and 15. The processor 50 by reading the memory 52 is able to load and execute the computer program instructions 54.

The computer program may arrive at the apparatus 2 via any suitable delivery mechanism. The delivery mechanism 56 may be, for example, a non-transitory computer-readable storage medium, a computer program product, a memory device, a record medium such as a Compact Disc Read-Only Memory (CD-ROM) or Digital Versatile Disc (DVD), an article of manufacture that tangibly embodies the computer program 54. The delivery mechanism may be a signal configured to reliably transfer the computer program 54. The apparatus 2 may propagate or transmit the computer program 54 as a computer data signal.

Although the memory 52 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The interconnection of components in a Figure indicates that they are operationally coupled and any number or combination of intervening elements can exist (including no intervening elements)

As used here 'module' refers to a unit or apparatus that excludes certain parts/components that would be added by an end manufacturer or a user. The proximity detector 4 may be a module 4, the controller 6 may be a module, the apparatus 2 may be a module.

The blocks illustrated in FIG. 13 may represent blocks in a method and/or sections of code in the computer program 54. The illustration of a particular order to the blocks does not necessarily imply that there is a required or preferred order for the blocks and the order and arrangement of the block may be varied. Furthermore, it may be possible for some blocks to be omitted.

FIG. 13 schematically illustrates how an apparatus 2: detects a first criteria; and switches from a first state using a first set of user actuations proximal to a proximity detector as a first set of valid user actuations to a second state using a second, set of user actuations different to the first set of user actuations, as a second set of valid user actuations instead of the first set of valid user wherein the second set of valid user actuations comprises user gestures that are invariant in effect if the apparatus is rotated relative to the user actuations.

The apparatus 2 may be configured, for example as described below, to switch, in response to detection of a second criteria, from second state to the first state.

As one example, after block 40 in FIG. 13, the method may return to block 34. If the first criteria is no longer detected, the method returns to block 32. In this example, the second criteria is an absence of the first criteria.

As an alternative example, after block 40, the method may return to block 34. If the first criteria is no longer detected and a second criteria is detected, then the method returns to block 32. In this example, the second criteria may be independent of the first criteria.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   at least one processor; and
   at least one memory including computer program code,
   the at least one memory and the computer program code configured to, with the at least one processor, cause the apparatus at least to perform:
   in a first state, enabling use of a first set of user actuations proximal to a proximity detector as a first set of valid user actuations, wherein each of the first set of user actuations comprises user gestures that are dependent at least in part on a rotation of the apparatus;
   in response to detecting a first criteria, changing from the first state to a second state; and
   in the second state, disabling at least one of the first set of user actuations and enabling the use of a second set of user actuations proximal to the proximity detector and different to the first set of user actuations, as a second set of valid user actuations,
   wherein the second set of valid user actuations comprises user gestures that are invariant in effect if the apparatus is rotated relative to the user actuations.

2. An apparatus as claimed in claim 1, wherein the apparatus, in the second state, is configured to determine at least one parameter dependent upon the user gesture, wherein the parameter is rotation invariant, having the same value when determined at different arbitrary rotations of the apparatus with respect to the user gesture, and the apparatus is configured to use the at least one parameter to identify a user gesture as a member of the second set of valid user actuations, wherein the second set of valid user actuations comprises user gestures that are invariant in effect if the apparatus is rotated relative to the user gestures through any arbitrary angle.

3. An apparatus as claimed in claim 1, further comprising at least one proximity detector configured to disambiguate accurately the second set of valid user actuations when separated from the at least one proximity detector by an opaque barrier.

4. An apparatus as claimed in claim 1, configured to associate an input control command with each member of the second set of valid user actuations wherein the input control command enables user control of an in-use application but does not enable selection of an application for use wherein the second set of valid user actuations is dependent upon an application that was in use when the first criteria was detected and enable control of that in-use application.

5. An apparatus as claimed in claim 1, wherein at least some of the second set of valid user actuations control output from an application wherein the application is an application for playing music tracks and the second set of valid user actuations comprises a first user gesture for scrolling forward one music track to a next music track and playing that next music track, and a second, different user gesture for scrolling backwards one music track to a previous music track and playing that previous music track, wherein the second, different user gesture has movement in an opposite direction to the first user gesture.

6. An apparatus as claimed in claim 1, wherein the first criteria is detection of a user-locking trigger.

7. A method comprising:
   in a first state of a device, enabling use of a first set of user actuations proximal to a proximity detector as a first set of valid user actuations, wherein each of the first set of user actuations comprises user gestures that are dependent at least in part on a rotation of the apparatus;
   in response to detecting a first criteria, changing from the first state to a second state of the device using a processor; and
   in the second state, disabling at least one of the first set of user actuations and enabling the use of a second set of user actuations proximal to the proximity detector and different to the first set of user actuations, as a second set of valid user actuations,
   wherein the second set of valid user actuations comprises user gestures that are invariant in effect if the apparatus is rotated relative to the user actuations.

8. The method of claim 7, wherein the first criteria is detection of a user-locking trigger.

9. The method of claim 7, further comprising:
in the second state, determining at least one parameter dependent upon the user gesture, wherein the parameter is rotation invariant, having the same value when determined at different arbitrary rotations of the apparatus with respect to the user gesture; and
using the at least one parameter to identify a user gesture as a member of the second set of valid user actuations, wherein the second set of valid user actuations comprises user gestures that are invariant in effect if the apparatus is rotated relative to the user gestures through any arbitrary angle.

10. The method of claim 7, further comprising using at least one proximity detector to disambiguate accurately the second set of valid user actuations when separated from the at least one proximity detector by an opaque barrier.

11. The method of claim 7, further comprising associating an input control command with each member of the second set of valid user actuations wherein the input control command enables user control of an in-use application but does not enable selection of an application for use wherein the second set of valid user actuations is dependent upon an application that was in use when the first criteria was detected and enable control of that in-use application.

12. The method of claim 7, wherein at least some of the second set of valid user actuations control output from an application wherein the application is an application for playing music tracks and the second set of valid user actuations comprises a first user gesture for scrolling forward one music track to a next music track and playing that next music track, and a second, different user gesture for scrolling backwards one music track to a previous music track and playing that previous music track, wherein the second, different user gesture has movement in an opposite direction to the first user gesture.

* * * * *